(12) United States Patent
Satake et al.

(10) Patent No.: US 8,986,123 B2
(45) Date of Patent: Mar. 24, 2015

(54) INFORMATION PROVISION APPARATUS AND PROGRAM

(75) Inventors: Shinya Satake, Tokyo (JP); Masahiro Akatsuka, Kanagawa (JP)

(73) Assignee: BANDAI NAMCO Games Inc., Tokyo (JP)

( * ) Notice: Subject to any disclaimer, the term of this patent is extended or adjusted under 35 U.S.C. 154(b) by 0 days.

(21) Appl. No.: 13/561,345

(22) Filed: Jul. 30, 2012

(65) Prior Publication Data

US 2013/0035165 A1    Feb. 7, 2013

(30) Foreign Application Priority Data

Aug. 3, 2011    (JP) ................. 2011-170108

(51) Int. Cl.
| | | |
|---|---|---|
| A63F 9/24 | (2006.01) | |
| A63F 13/00 | (2006.01) | |
| G06F 17/00 | (2006.01) | |
| G06F 19/00 | (2011.01) | |
| A63F 13/40 | (2014.01) | |
| H04L 29/06 | (2006.01) | |
| A63F 13/30 | (2014.01) | |

(52) U.S. Cl.
CPC .......... *A63F 13/10* (2013.01); *H04L 29/06034* (2013.01); *A63F 13/12* (2013.01); *A63F 2300/406* (2013.01); *A63F 2300/407* (2013.01)
USPC .................. 463/42; 463/20; 463/25; 463/39; 463/40; 463/41; 369/116; 369/283

(58) Field of Classification Search
USPC ............. 463/20, 25, 39, 40, 41, 42; 395/600, 395/800, 135, 140; 369/116, 283; 705/26, 705/27
See application file for complete search history.

(56) References Cited

U.S. PATENT DOCUMENTS

| | | | |
|---|---|---|---|
| 5,727,158 A * | 3/1998 | Bouziane et al. ............. | 709/225 |
| 7,291,064 B2 | 11/2007 | Yamada et al. | |
| 7,789,759 B2 | 9/2010 | Yoshioka | |
| 8,052,520 B2 | 11/2011 | Park | |
| 2008/0220876 A1* | 9/2008 | Mehta et al. .................... | 463/42 |
| 2010/0121729 A1* | 5/2010 | Betzler et al. .................. | 705/26 |
| 2010/0280919 A1* | 11/2010 | Everett et al. .................. | 705/27 |

FOREIGN PATENT DOCUMENTS

| | | |
|---|---|---|
| JP | 2002-292121 A | 10/2002 |
| JP | A-2003-169965 | 6/2003 |
| JP | 2003-225459 A | 8/2003 |
| JP | 2007-529817 A | 10/2007 |
| JP | 2008-104502 A | 5/2008 |
| JP | B2-4442981 | 3/2010 |

\* cited by examiner

*Primary Examiner* — Adetokunbo O Torimiro
(74) *Attorney, Agent, or Firm* — Posz Law Group, PLC

(57) ABSTRACT

An information provision apparatus includes a storage section that stores item data, an update section that updates the item data when an item quantity change event has occurred during a first game that is executed by a first terminal, and a control section that causes a communication section to transmit item information to a second terminal when a purchase request operation has been performed by using a second terminal.

13 Claims, 11 Drawing Sheets

FIG. 7

| | | | | 500 |
|---|---|---|---|---|
| GOURMET MARKET | | FIRST STAGE JUNGLE CAMPGROUND | | |
| PURCHASE INGREDIENT | NUMBER OF INGREDIENTS 9100 | MONEY 100000 | | |
| INGREDIENT | QUANTITY | PRICE | SELLER | |
| INGREDIENT A | 1 | 10000 | BEAUTIFUL COOK | |
| INGREDIENT B | 2 | 10000 | SELF-STYLED COOK | |
| INGREDIENT C | 5 | 5000 | HOT-BLOODED CAPTAIN | |
| INGREDIENT D | 10 | 1000 | WANNABE COOK | |
| INGREDIENT E | 10 | 1000 | DEDICATED COOK | |
| INGREDIENT F | 20 | 1000 | WOULD-BE COOK | |
| INGREDIENT G | 50 | 1000 | DELICATE COOK | |
| INGREDIENT H | 100 | 1000 | EARNEST COOK | |
| SELECT INGREDIENT | | | | |

INFORMATION PROVISION APPARATUS AND PROGRAM

Japanese Patent Application No. 2011-170108 filed on Aug. 3, 2011, is hereby incorporated by reference in its entirety.

BACKGROUND OF THE INVENTION

The present invention relates to an information provision apparatus and a program.

Japanese Patent No. 4442981 and JP-A-2003-169965 disclose a method that allows different game devices to utilize a common game parameter.

The above method aims at a single player, or utilizes a single game parameter (e.g., breeding target character), but does not aim at using a plurality of common game parameters that are changed by a number of players.

The above method normally allows a player to play a similar game using different game devices. However, a player normally plays a game using a single game device owned by the player. Therefore, it is unlikely that the above method prompts a player to play a game using different game devices.

An item used in a game is normally traded at a fixed price. Therefore, an item is monotonously traded between players. When determining the price of an item based on the supply and demand according to economic principles, it is difficult to promptly provide an item due to a complex process.

SUMMARY

The invention was devised in view of the above problems. Several aspects of the invention may provide an information provision apparatus and a program that can provide an item that changes in quantity when an item quantity change event has occurred during a first game that is executed by a first terminal that belongs to a first game network, to a second terminal that belongs to a second game network.

According to a first aspect of the invention, there is provided an information provision apparatus comprising:

a storage section that stores item data that indicates a plurality of items that can be provided;

a communication section;

an update section that updates the item data when an item quantity change event has occurred during a first game that is executed by a first terminal that belongs to a first game network; and a control section that causes the communication section to transmit item information to a second terminal that belongs to a second game network when a provision request operation has been performed by using the second terminal, the item information indicating at least one item that can be used in a second game that is executed by the second terminal, and being based on the item data.

According to a second aspect of the invention, there is provided an information provision apparatus comprising:

a storage section that stores provision history data about occurrence of an item provision event during a second game that is executed by a second terminal that belongs to a second game network;

a communication section;

a control section that stores item data that is updated when an item quantity change event has occurred during a first game that is executed by a first terminal that belongs to a first game network, and indicates a plurality of items that can be provided to the second terminal, the control section causing the communication section to receive information about the item data, the information being stored in a first game server that manages the first game network, and the control section causing the communication section to transmit item information based on the information about the item data to the second terminal based on the provision history data; and an update section that updates the provision history data based on information that indicates an item provision request that has been received from the second terminal by the communication section.

According to a third aspect of the invention, there is provided a program that causes a computer having a storage section that stores item data indicating a plurality of items that can be provided, and a communication section, to function as:

an update section that updates the item data when an item quantity change event has occurred during a first game that is executed by a first terminal that belongs to a first game network; and a control section that causes the communication section to transmit item information to a second terminal that belongs to a second game network when a provision request operation has been performed by using the second terminal, the item information indicating at least one item that can be used in a second game that is executed by the second terminal, and being based on the item data.

According to a fourth aspect of the invention, there is provided a program that causes a computer having a storage section that stores provision history data about occurrence of an item provision event during a second game that is executed by a second terminal that belongs to a second game network, and a communication section, to function as:

a control section that stores item data that is updated when an item quantity change event has occurred during a first game that is executed by a first terminal that belongs to a first game network, and indicates a plurality of items that can be provided to the second terminal, the control section causing the communication section to receive information about the item data, the information being stored in a first game server that manages the first game network, and the control section causing the communication section to transmit item information based on the information about the item data to the second terminal based on the provision history data; and an update section that updates the provision history data based on information that indicates an item provision request that has been received from the second terminal by the communication section.

BRIEF DESCRIPTION OF THE SEVERAL VIEWS OF THE DRAWING

FIG. 7 is a diagram illustrating an item list image that is displayed on a portable game device according to the first embodiment.

DETAILED DESCRIPTION OF THE EMBODIMENT

Figure 1:
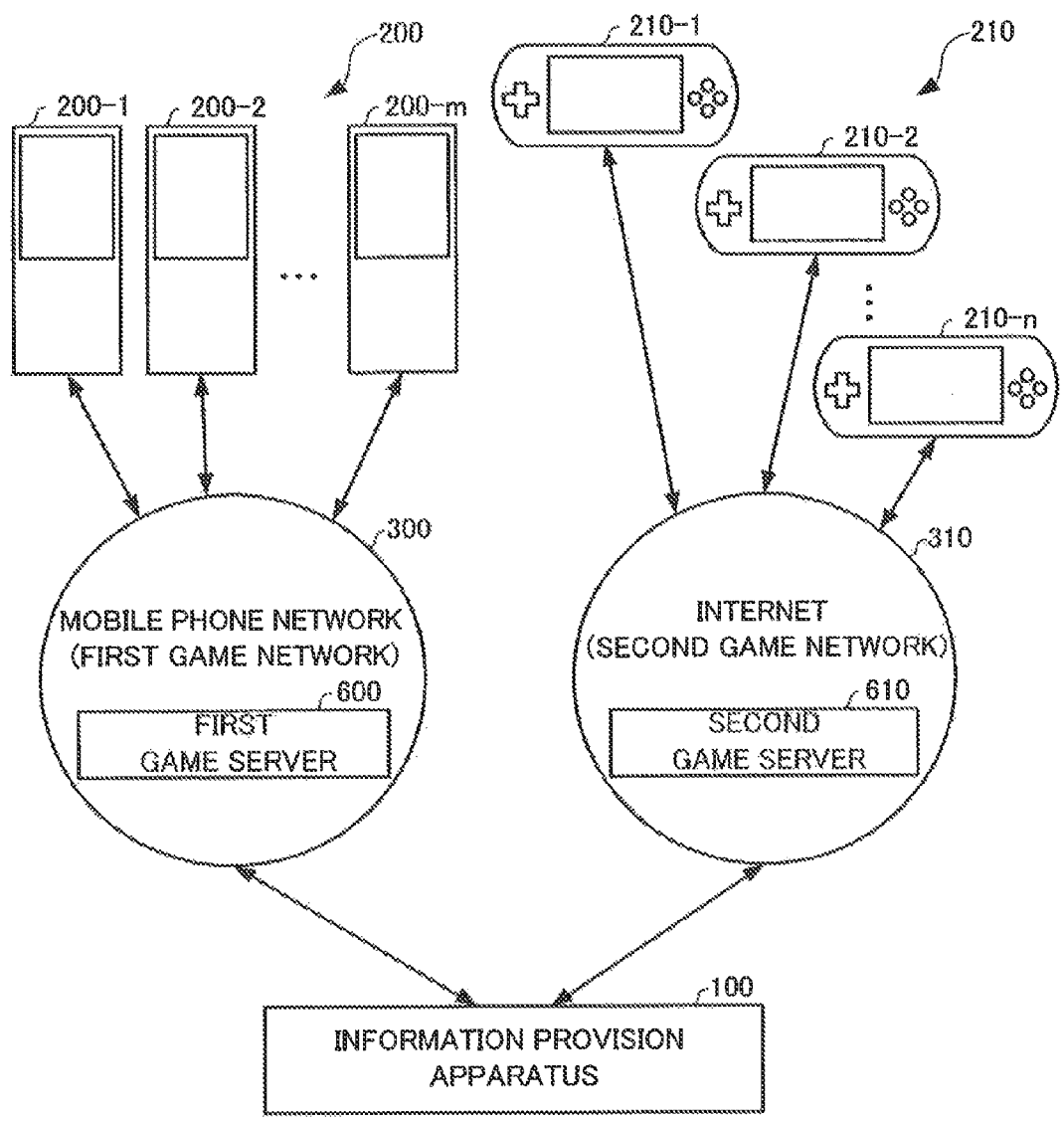
FIG. 1 is a diagram illustrating a game system according to a first embodiment.

According to one embodiment of the invention, there is provided an information provision apparatus including:

a storage section that stores item data that indicates a plurality of items that can be provided;

a communication section;

an update section that updates the item data when an item quantity change event has occurred during a first game that is executed by a first terminal that belongs to a first game network; and a control section that causes the communication section to transmit item information to a second terminal that belongs to a second game network when a provision request operation has been performed by using the second terminal, the item information indicating at least one item that can he used in a second game that is executed by the second terminal, and being based on the item data.

According to one embodiment of the invention, there is provided a program that causes a computer having a storage section that stores item data indicating a plurality of items that can be provided, and a communication section, to function as:

an update section that updates the item data when an item quantity change event has occurred during a first game that is executed by a first terminal that belongs to a first game network; and a control section that causes the communication section to transmit item information to a second terminal that belongs to a second game network when a provision request operation has been performed by using the second terminal, the item information indicating at least one item that can he used in a second game that is executed by the second terminal, and being based on the item data.

The above embodiments can provide the item information in response to a provision request operation performed using the second terminal that belongs to the second game network by updating the item data when the item quantity change event has occurred during the first game executed by the first terminal that belongs to the first game network.

According to one embodiment of the invention, there is provided an information provision apparatus including:

a storage section that stores provision history data about occurrence of an item provision event during a second game that is executed by a second terminal that belongs to a second game network;

a communication section;

a control section that stores item data that is updated when an item quantity change event has occurred during a first game that is executed by a first terminal that belongs to a first game network, and indicates a plurality of items that can be provided to the second terminal, the control section causing the communication section to receive information about the item data, the information being stored in a first game server that manages the first game network, and the control section causing the communication section to transmit item information based on the information about the item data to the second terminal based on the provision history data; and an update section that updates the provision history data based on information that indicates an item provision request that has been received from the second terminal by the communication section.

According to one embodiment of the invention, there is provided an information provision system including the information provision apparatus and the first game server.

According to one embodiment of the invention, there is provided a program that causes a computer having a storage section that stores provision history data about occurrence of an item provision event during a second game that is executed by a second terminal that belongs to a second game network, and a communication section, to function as:

a control section that stores item data that is updated when an item quantity change event has occurred during a first game that is executed by a first terminal that belongs to a first game network, and indicates a plurality of items that can be provided to the second terminal, the control section causing the communication section to receive information about the item data, the information being stored in a first game server that manages the first game network, and the control section causing the communication section to transmit item information based on the information about the item data to the second terminal based on the provision history data; and an update section that updates the provision history data based on information that indicates an item provision request that has been received from the second terminal by the communication section.

The above embodiments can provide the item information based on the item data that is updated when the item quantity change event has occurred during the first game executed by the first terminal that belongs to the first game network in response to a provision request from the second terminal that belongs to the second game network.

In each of the information provision apparatus, the information provision system, and the program, the plurality of items may be able to be exchanged during the second game, and the information provision apparatus may further include a determination section that determines a value of each of the plurality of items based on a change in quantity of each of the plurality of items.

In each of the information provision apparatus, the information provision system, and the program, the plurality of items may be able to be exchanged during the second game, the second terminal may include a determination section that determines a value of each of the plurality of items based on to a change in quantity of each of the plurality of items, and the control section may provide information that indicates the change in quantity to the determination section.

The above embodiments make it possible to determine the value of each item based on the change in quantity of each item, and reflect the value in the item data.

In each of the information provision apparatus, the information provision system, and the program, the plurality of items may be able to be sold during the second game, and the determination section may determine a price of each of the plurality of items so that the price decreases as the quantity of each of the plurality of items increases, regardless of a sales quantity of each of the plurality of items.

The above embodiments can more promptly provide an item by a simple process by determining the price of each item so that the price of each item decreases as the quantity of each item increases regardless of the sales quantity of each item.

In each of the information provision apparatus, the information provision system, and the program, the determination section may calculate the change in quantity of each of the plurality of items for a specific time interval in response to occurrence of the item quantity change event, and may determine the price of each of the plurality of items at the specific time interval.

The above embodiments can determine an appropriate price based on the latest quantity by calculating the quantity of each item at a specific time interval, and determining the price of each item at a specific time interval.

In each of the information provision apparatus, the information provision system, and the program, the determination section may adjust a price of each of the plurality of items corresponding to the quantity of each of the plurality of items that is possessed by the second terminal in the second game.

The above embodiments can more easily change the price of each item.

In each of the information provision apparatus, the information provision system, and the program, the storage section may store dummy data about each of the plurality of items, and the update section may update the item data to fill up a shortage of an item among the plurality of items based on the dummy data when a quantity of the item is insufficient.

The above embodiments can provide an item without causing a shortage of each item.

In each of the information provision apparatus, the information provision system, and the program, the update section may delete an item among the plurality of items that is indicated by the item information transmitted by the communication section from the item data.

The above embodiments can prevent a situation in which the quantity of each item becomes too large even if the number of players is large.

In each of the information provision apparatus, the information provision system, and the program, the update section may set a parameter value of an item among the plurality of items that is added to the item data when the item quantity change event has occurred, to a value that differs from a parameter value of an item among the plurality of items that is added to the item data independently of the item quantity change event.

According to the above embodiments, when the second game is executed by the second terminal, the game proceeds in a state that differs from a normal state since the parameter value of the item supplied by the first game differs from a normal parameter value. This makes it possible to prompt the player to supply an item in the first game, or purchase an item in the second game, for example.

It is noted that each of the above programs may be stored in a non-transitory computer-readable information storage medium.

Exemplary embodiments in which the invention is applied to an information provision apparatus and others are described below with reference to the drawings. Note that the following embodiments do not unduly limit the scope of the invention as stated in the claims. Note also that all of the elements described below should not necessarily be taken as essential elements of the invention.

First Embodiment

FIG. 1 is a diagram illustrating a game system according to a first embodiment of the invention. The game system according to the first embodiment has a configuration in which m mobile phones (first terminals) 200 are connected to a mobile phone network (first game network) 300, n portable game devices (second terminals) 210 are connected to an Internet (second game network) 310, and each terminal exchanges information with an information provision apparatus 100 via the mobile phone network 300 and the Internet 310. The first game network is managed by a first game server 600, and the second game network is managed by a second game server 610.

The mobile phone 200 executes an ingredient search game in which a character operated by the player can obtain an ingredient that is used only in the game, and an ingredient that can be supplied to a virtual market.

The portable game device 210 executes a game in which a character operated by the player can purchase an ingredient in the virtual market, or obtain an ingredient by battling with an enemy, and can improve the level by cooking and eating the ingredient.

The information provision apparatus 100 provides the virtual market, receives item supply information that indicates an item (ingredient) from the mobile phone 200, updates data that indicates the price and the like of the item in the virtual market, and transmits item information to the portable game device 210, the item information indicating a purchase target item that corresponds to a purchase operation performed using the portable game device 210. The functional blocks of the information provision apparatus 100 having the above functions are described below.

Figure 2:
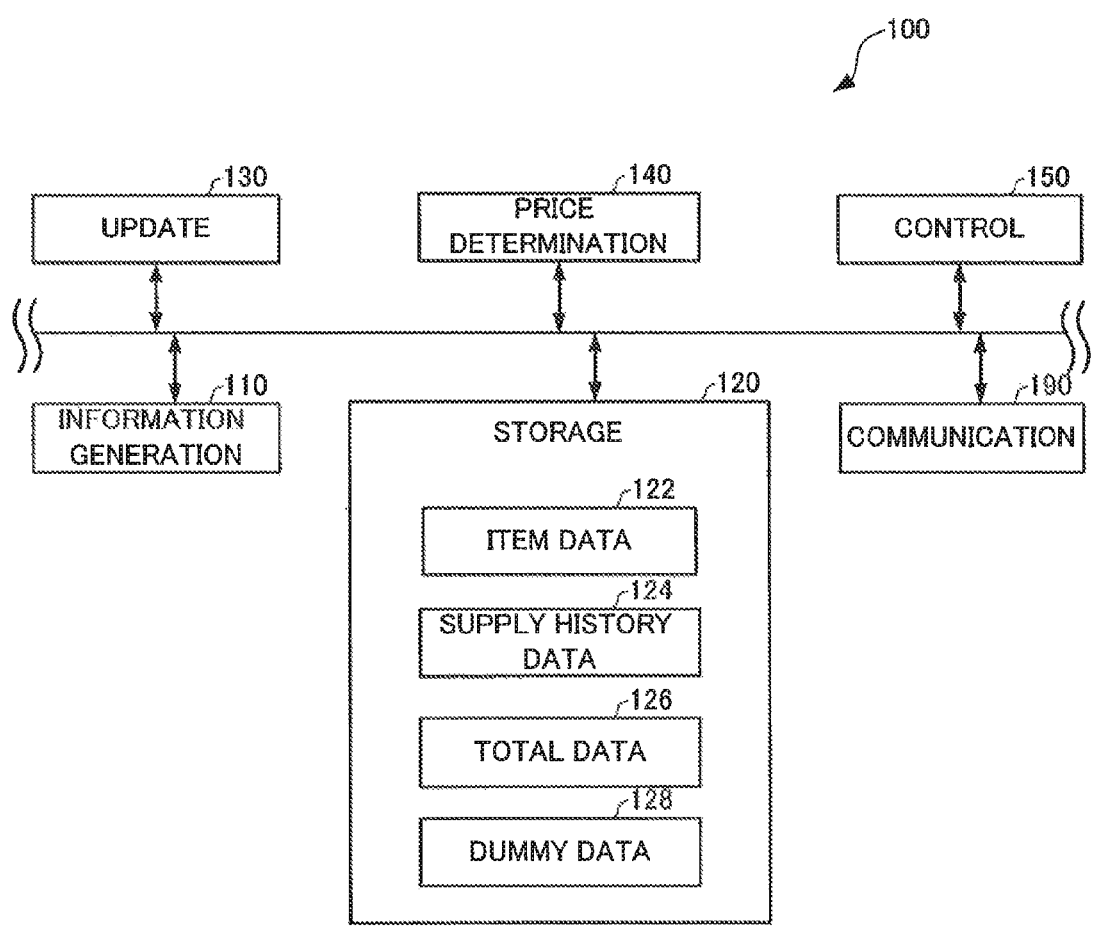
FIG. 2 is a diagram illustrating the functional blocks of an information provision apparatus according to the first embodiment.

FIG. 2 is a diagram illustrating the functional blocks of the information provision apparatus 100 according to the first embodiment. The information provision apparatus 100 includes an information generation section 110 that generates item information and the like transmitted to the mobile phone 200, a storage section 120, an update section 130 that updates data stored in the storage section 120, a price determination section (determination section) 140 that determines the price of each item, a communication section 190, and a control section 150 that controls the communication section 190 and the like.

The storage section 120 stores item data 122 that includes data that indicates the type, quantity, and price of each item, supply history data 124 that indicates the item supply history of the mobile phone 200, total data 126 that indicates the calculation results of the price determination section 140, dummy data 128 that is used when the quantity of each item is insufficient, and the like.

The information provision apparatus 100 is implemented by a plurality of servers (e.g., application server, web server, search server, and database server). Note that the information provision apparatus 100 may be implemented by a single server when the game system is small.

The information provision apparatus 100 may read a program from an information storage medium either directly or indirectly (e.g., via a network) to function as the update section 130 and the like. For example, a single server that includes the storage section 120 and controls the communication section 190 may read a program to function as the update section 130 that updates the item data 122 and the like stored in the storage section 120, and the control section 150 that controls the communication section 190. Alternatively, an application server that controls a database server that includes the storage section 120 and controls the communication section 190 may read a program to function as the update section that causes the database server to update the item data 122 and the like stored in the storage section 120, and the control section 150 that controls the communication section 190.

Figure 3:
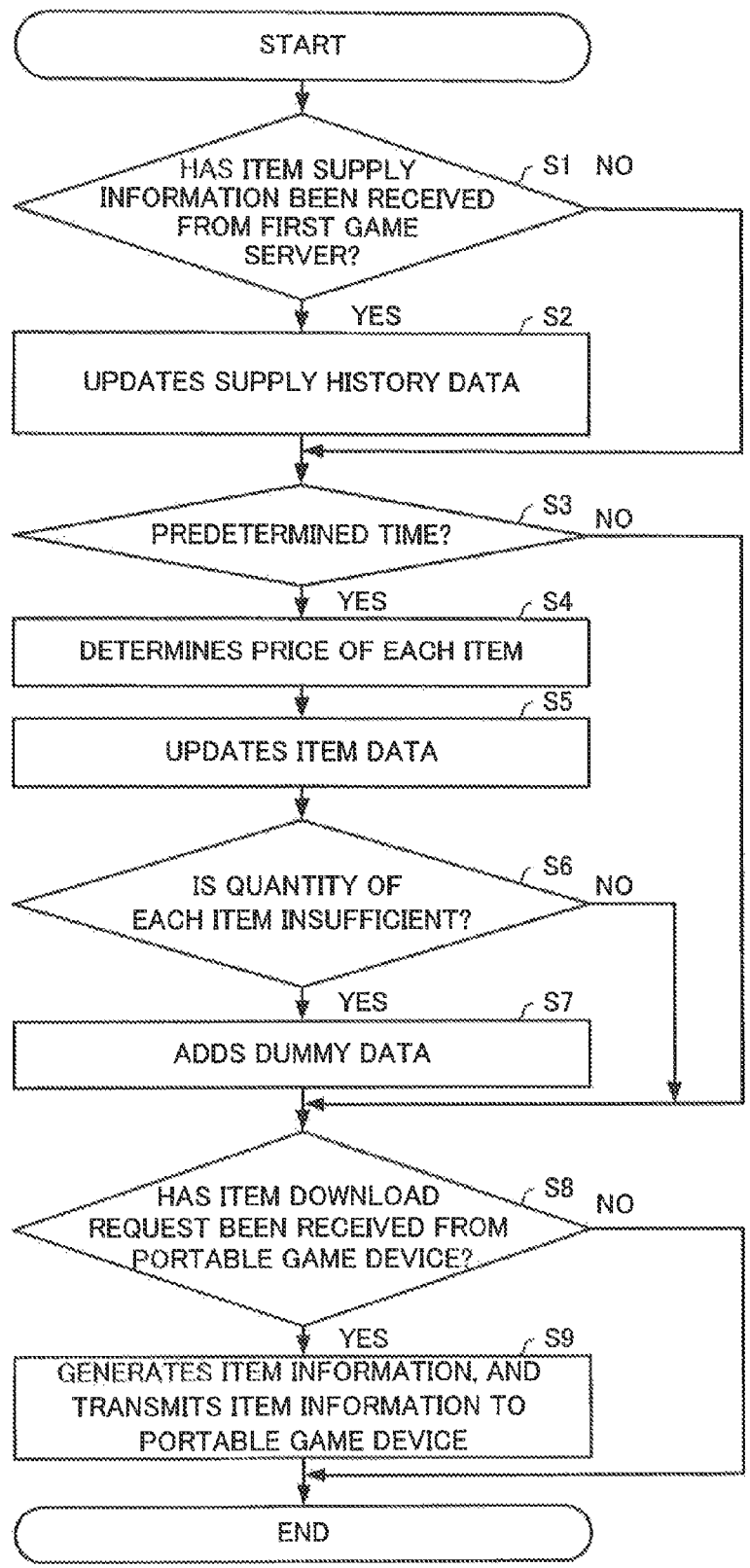
FIG. 3 is a flowchart illustrating a process performed by an information provision apparatus according to the first embodiment.
Figure 4:
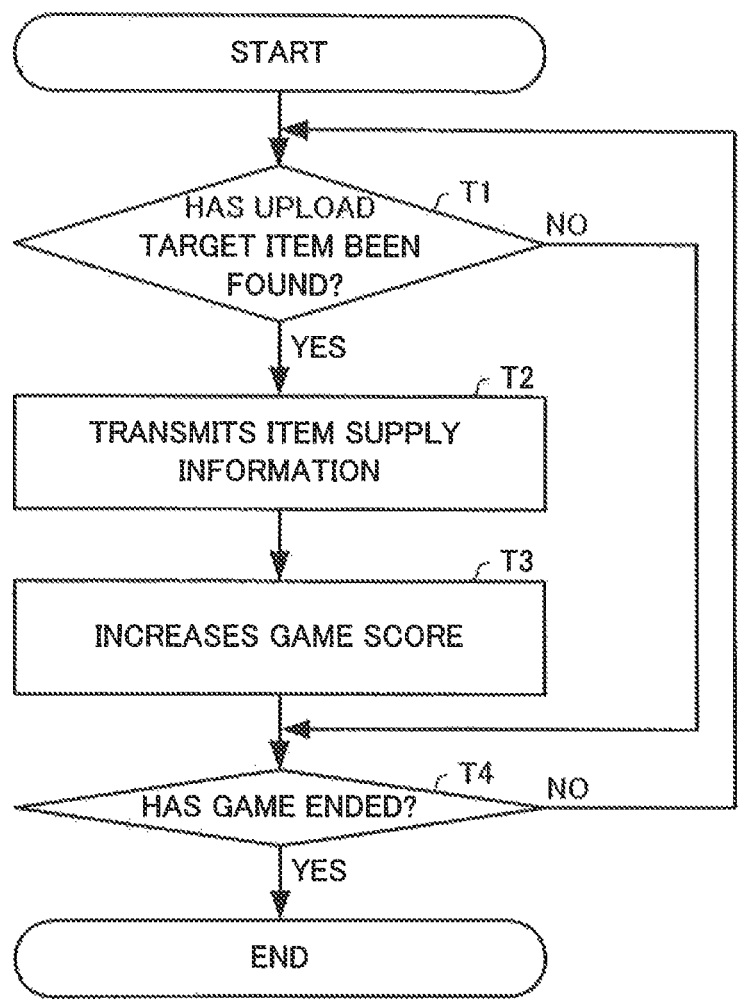
FIG. 4 is a flowchart illustrating a process performed by a first game server according to the first embodiment.

An item supply/provision process is described below. FIG. 3 is a flowchart illustrating a process performed by the information provision apparatus 100 according to the first embodiment. FIG. 4 is a flowchart illustrating a process performed by the first game server 600 according to the first embodiment.

The first game server 600 determines whether or not an upload target item has been found (i.e., whether or not an item quantity change event has occurred) in the ingredient search game distributed to the mobile phone 200 (step T1). When the first game server 600 has determined that the upload target item has been found, the first game server 600 transmits the item supply information (e.g., info nation that indicates item identification information, supply quantity, and supply date) that indicates the upload target item to the information provision apparatus 100 (step T2), and increases the game score (step T3). The first game server 600 determines whether or not the game distributed to the mobile phone 200 has ended (step T4). When the first game server 600 has determined that the game has not ended, the first game server 600 repeats the above process (steps T1 to T4).

Figure 5:
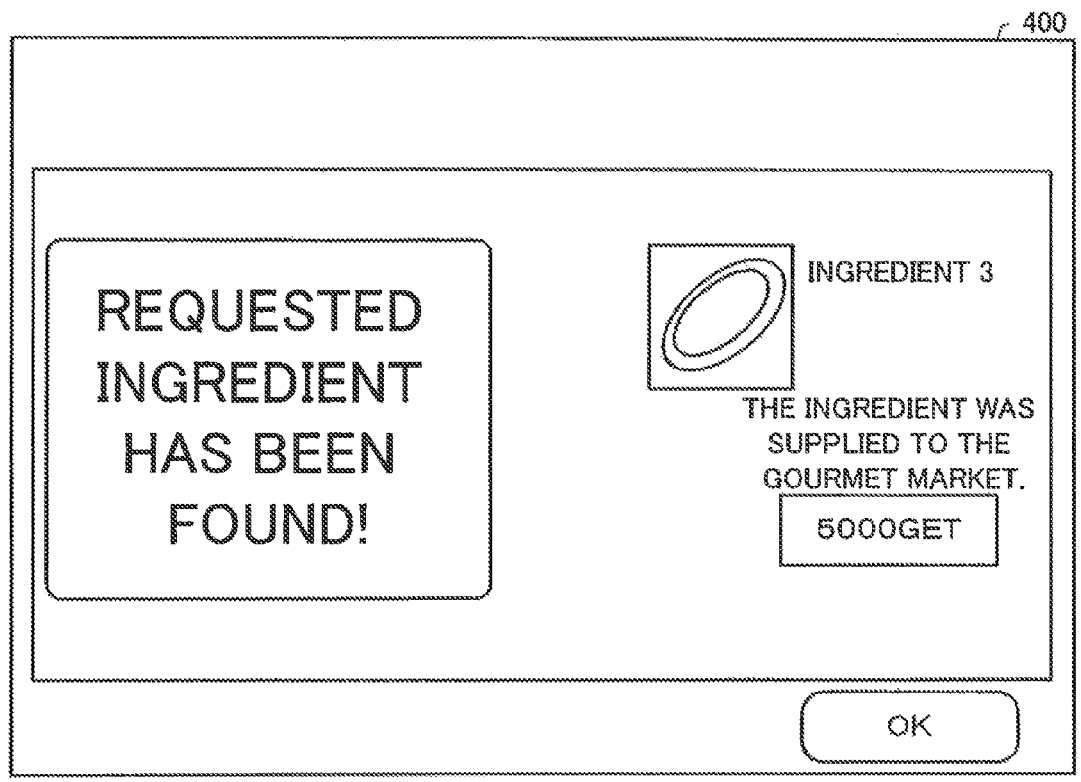
FIG. 5 is a diagram illustrating an item find image displayed on a mobile phone according to the first embodiment.

FIG. 5 is a diagram illustrating an item find image 400 that is displayed on the mobile phone 200 according to the first embodiment. For example, when the upload target item has been found, the mobile phone 200 displays the item find image 400 on the screen of the mobile phone 200 based on the information distributed from the first game server 600, the item find image 400 including an image that indicates that the upload target item has been found, an image that indicates the item that has been found, an image that indicates that the item has been provided to the virtual market, and an image that indicates the points that have been added. In the first embodiment, the first game server 600 automatically provides the upload target item to the virtual market independently of selection by the player.

The control section 150 determines whether or not the item supply information has been received from the first game server 600 based on information from the communication section 190 (step S1). When the control section 150 has determined that the item supply information has been received, the update section 130 updates the supply history data 124 under control of the control section 150 (step S2).

The price determination section 140 determines whether or not a specific time (e.g., 0:00 a.m.) has been reached (i.e., whether or not a specific time period has elapsed) (step S3). When the price determination section 140 has determined that the specific time has been reached, the price determination section 140 calculates the supply quantity of each item based on the supply history data 124, the update section 130 updates the total data 126 based on the calculation results of the price determination section 140, and the price determination section 140 determines the price of each item based on the total data 126 (step S4). The update section 130 updates the item data 122 based on the total data 126 and the price determined by the price determination section 140 (step S5).

More specifically, the price determination section 140 determines the price of each item so that the price of an item decreases as the supply quantity of the item for a specific time interval (e.g., 24 hours, 12 hours, 6 hours, or 1 hour) increases. For example, the price determination section 140 may determine the price of each item based on the ratio of the supply quantity within 24 hours to a reference quantity, the ratio of the supply quantity within the latest 24 hours to the supply quantity within the preceding 24 hours, or the like. An upper-limit value and a lower-limit value may be set to the price of each item.

The control section 150 determines whether or not the quantity of each item is insufficient referring to the item data 122 (step S6). When the control section 150 has determined that the quantity of a specific item is insufficient, the update section 130 adds dummy data that corresponds to the specific item to the item data 122 based on the dummy data 128 under control of the control section 150 (step S7). For example, the dummy data 128 may include a plurality of groups corresponding to each item, and a group that differs from the group that was previously added (e.g., the group that was added on the previous day) may be randomly selected, and added to the item data 122.

The control section 150 determines whether or not an item download request has been received from the portable game device 210 based on information from the communication section 190 (step S8). When the control section 150 has determined that the item download request has been received from the portable game device 210, the information generation section 110 generates the item information based on the item data 122, and the communication section 190 transmits the item information to the portable game device 210 that has transmitted the item download request under control of the control section 150 (step S9). Note that the item information may be the identification information about the item when image data, attribute data, and the like of the item are stored in the mobile phone 200 and the second game server 610, and may be information that indicates the image data, attribute data, and the like of the item when the image data, attribute data, and the like of the item are not stored in the mobile phone 200 and the second game server 610.

In the first embodiment, the item information that indicates a plurality of items is transmitted to the portable game device 210, and the update section 130 deletes the data that indicates the plurality of items from the item data 122 when the plurality of items have not been transmitted as dummy data, and does not delete the data that indicates the plurality of items from the item data 122 when the plurality of items have been transmitted as dummy data. The data based on the dummy data is deleted from the item data 122 when the supply quantity of the item has become sufficient.

Figure 6:
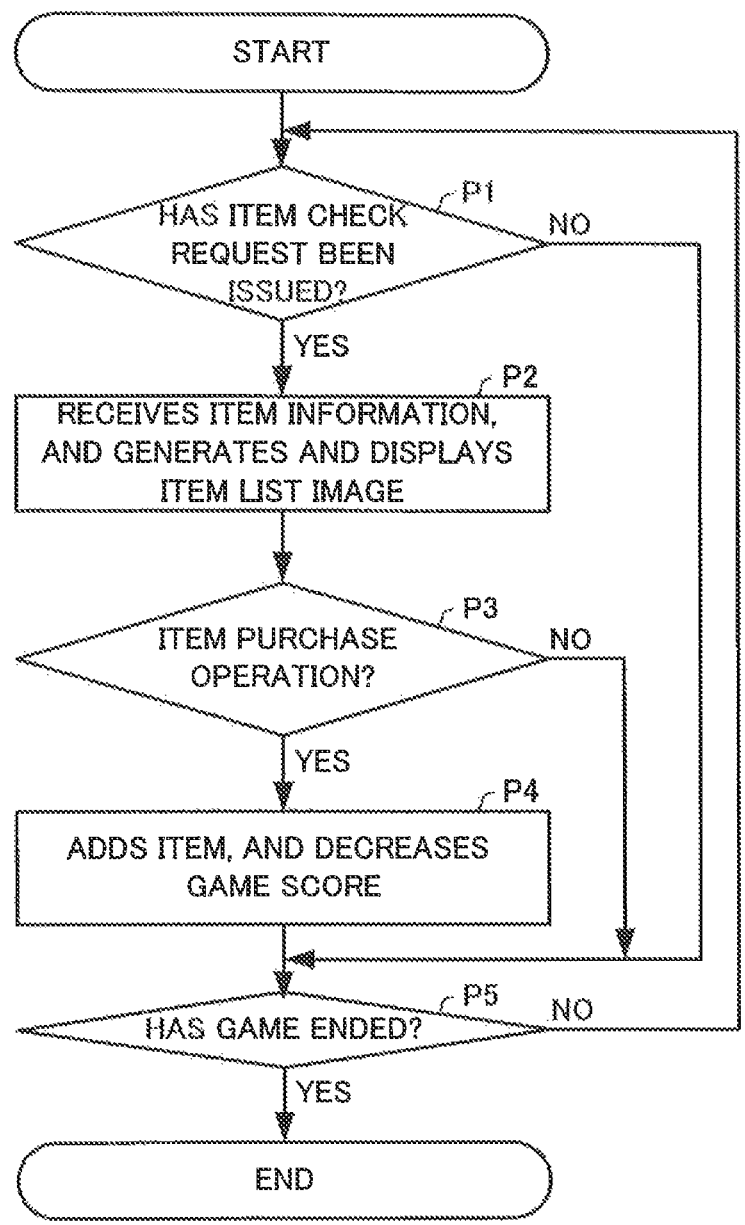
FIG. 6 is a flowchart illustrating a process performed by a portable game device according to the first embodiment.

FIG. 6 is a flowchart illustrating a process performed by the portable game device 210 according to the first embodiment. The portable game device 210 determines whether or not the player of the portable game device 210 has issued an item check request (purchase request) by operating the portable game device 210 (step P1). When the portable game device 210 has determined that the player has issued the item check request, the portable game device 210 transmits information that indicates a download request to the information provision apparatus 100, receives the item information from the information provision apparatus 100, and generates and displays an item list image (step P2).

Note that the information that indicates the download request may include identification information about the portable game device 210. The identification information may be an account used to log into the second game network, an identification number, a save data number, or the like of the portable game device 210, or a combination thereof. This also applies to identification information about the mobile phone 200.

FIG. 7 is a diagram illustrating an item list image 500 that is displayed on the portable game device 210 according to the first embodiment. The item list image 500 indicates a list of items that can be sold in the virtual market, and includes an image that indicates the current location, the number of ingredients possessed by the player, and the amount of money owned by the player, an image that indicates a list of the type, the quantity, the price, and the seller of each ingredient (item) that can be purchased, a cursor image used to select an ingredient, a button image used to purchase an ingredient, and the like. In the first embodiment, the name of each seller is automatically generated (e.g., generated using a combination of an adjective and a noun that can be selected) by the update section 130 when the supply history data 124 is generated.

The portable game device 210 determines whether or not the player has performed an item purchase operation by selecting (pressing) the button image used to purchase an ingredient (step P3). When the portable game device 210 has determined that the player has performed the item purchase operation, the portable game device 210 adds the purchase target item to possessed item data stored in the portable game device 210, and decreases the game score (i.e., the amount of money) (step P4). The portable game device 210 then determines whether or not the game has ended (step P5). When the portable game device 210 has determined that the game has not ended, the portable game device 210 repeats the above process (steps P1 to P5).

According to the first embodiment, the information provision apparatus 100 can provide a plurality of items that can be sold in the virtual market to the portable game device 210 that belongs to the Internet 310.

More specifically, the information provision apparatus 100 can provide a plurality of items that are supplied to the virtual market when the item quantity change event has occurred during the first game executed by the mobile phone 200 that belongs to the mobile phone network 300, and can be sold in the virtual market, to the portable game device 210 that belongs to the Internet 310.

The information provision apparatus 100 can thus more effectively link the first game executed by the mobile phone 200 and the second game executed by the portable game device 210. The information provision apparatus 100 can also prompt the player to play a game using the mobile phone 200 in addition to the portable game device 210.

According to the first embodiment, the information provision apparatus 100 can more promptly provide each item by a simple process by determining the price of each item so that the price of each item decreases as the supply quantity of each item increases regardless of the sales quantity of each item.

According to the first embodiment, the information provision apparatus 100 can determine an appropriate price based on the latest supply quantity of each item, and more promptly perform the calculation process and the like by calculating the supply quantity of each item at a specific time interval, determining the price of each item, and updating the data that indicates the price of each item. According to this configuration, since the price of each item changes at a specific time interval, the player can enjoy selecting the item purchase timing.

According to the first embodiment, the information provision apparatus 100 can provide each item without causing a shortage of each item by utilizing the dummy data 128.

Second Embodiment

The first terminal is not limited to the mobile phone 200, but may be a smartphone, a game device, a personal computer (PC), or the like. The second terminal is not limited to the portable game device 210, but may be a consumer game device, an arcade game device, a PC, a mobile phone, a smartphone, or the like. The first game network and the second game network may be physically identical, but may logically differ from each other, differing from the first embodiment in which the first game network and the second game network physically differ from each other. The functions of the price determination section 140, the storage section 120, and the like may be distributed over a plurality of devices.

Figure 8:
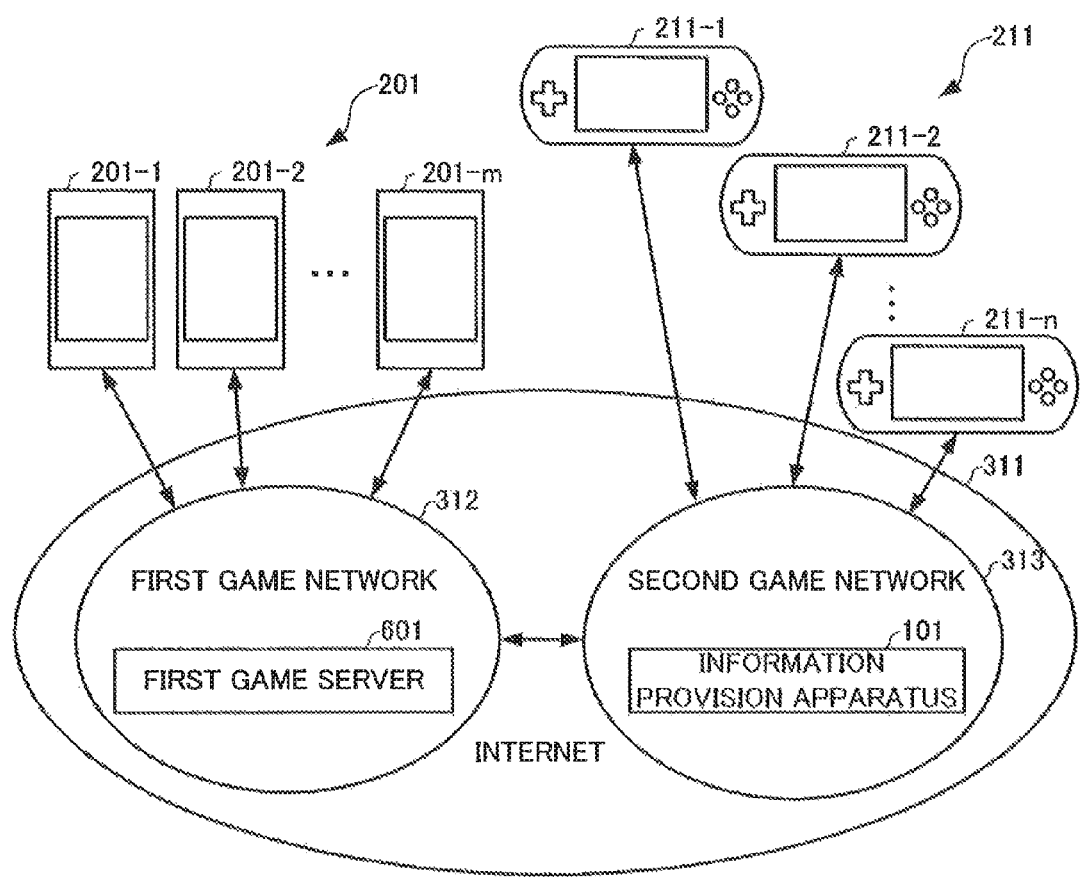
FIG. 8 is a diagram illustrating a game system according to a second embodiment.

FIG. 8 is a diagram illustrating a game system according to a second embodiment of the invention. A first game network 312 and a second game network 313 are included in an Internet 311, and a first game server 601 that manages the first game network 312 exchanges information with an information provision apparatus 101 that manages the second game network 313, m smartphones 201 are connected to the first game network 312, and n portable game devices 211 are connected to the second game network 313. The first game server 601 and the information provision apparatus 101 function as an information provision system that provides information to the portable game device 211.

Figure 9:
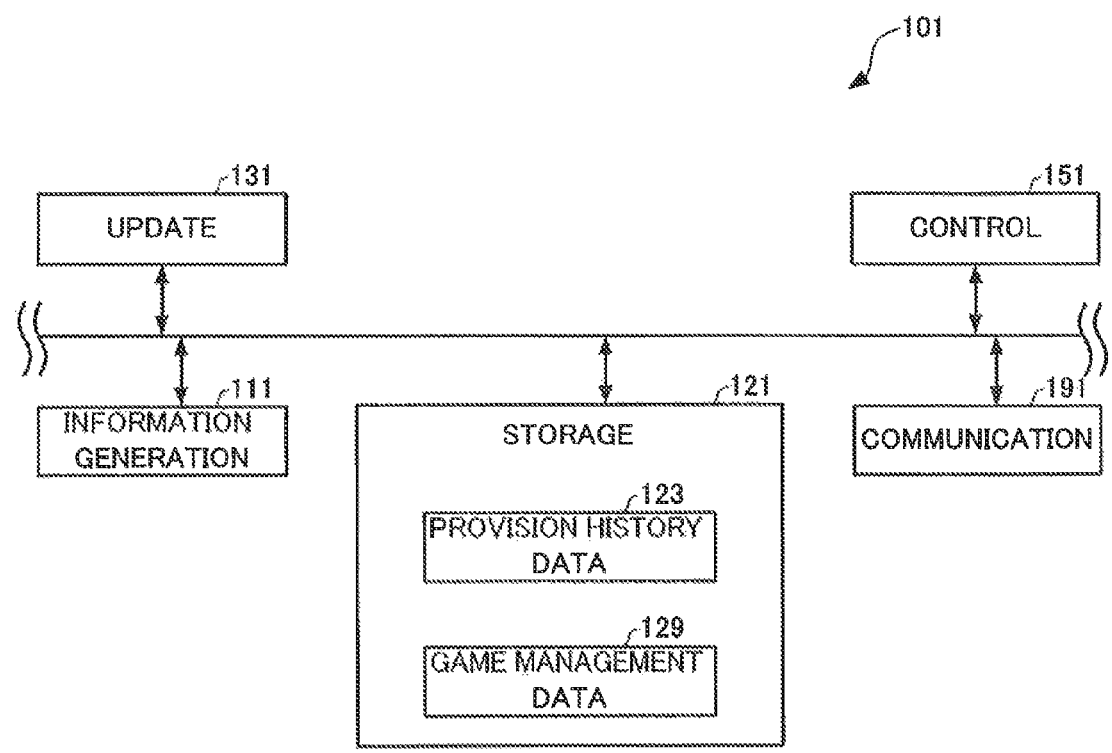
FIG. 9 is a diagram illustrating the functional blocks of an information provision apparatus according to the second embodiment.

FIG. 9 is a diagram illustrating the functional blocks of the information provision apparatus 101 according to the second embodiment. The information provision apparatus 101 includes an information generation section 111, a storage section 121, an update section 131 that updates data stored in the storage section 121, a communication section 191, and a control section 151 that controls the communication section 191 and the like. The storage section 121 stores provision history data 123 that indicates the history of provision of an item to the portable game device 211, game management data 129 that indicates information about the management of the second game network 313, and the like.

The information provision apparatus 101 may read a program from an information storage medium either directly or indirectly (e.g., via a network) to function as the control section 151 and the like.

Figure 10:
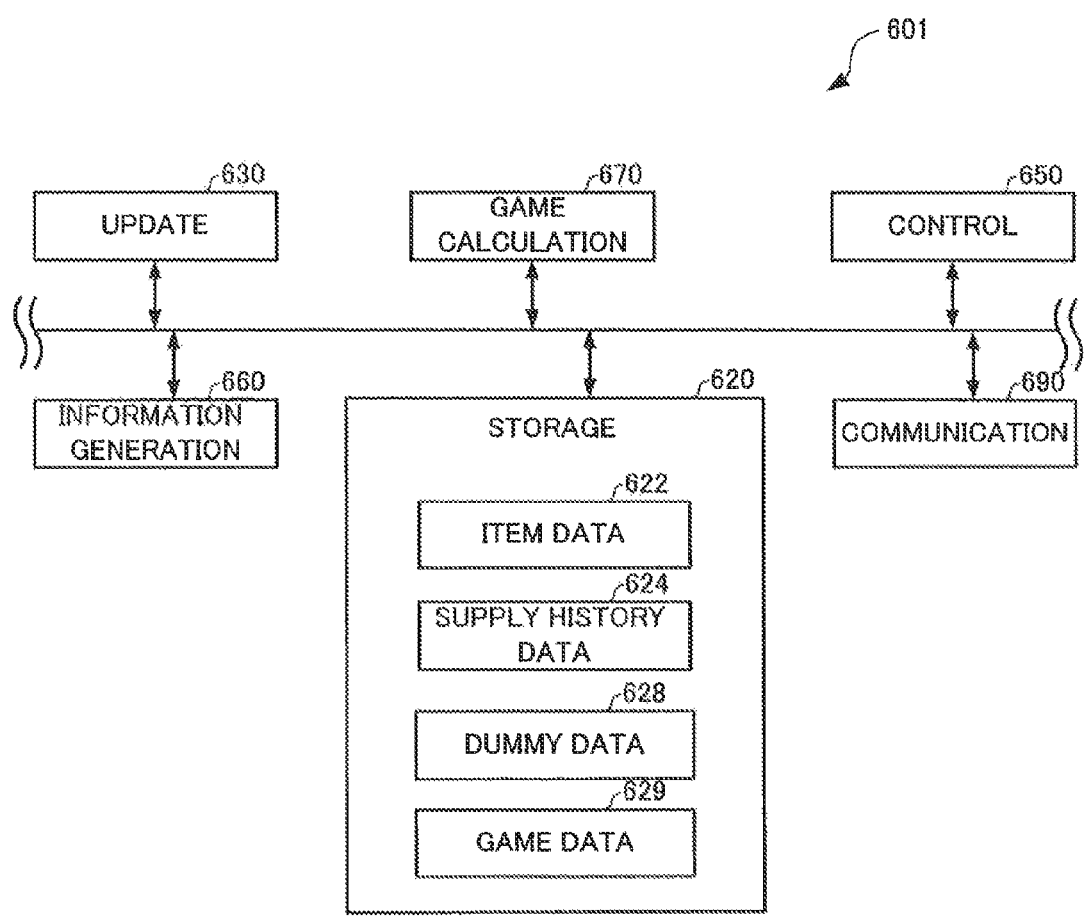
FIG. 10 is a diagram illustrating the functional blocks of a first game server according to the second embodiment.

FIG. 10 is a diagram illustrating the functional blocks of the first game server 601 according to the second embodiment. The first game server 601 includes a storage section 620, an update section 630, a control section 650, an information generation section 660, a game calculation section 670, and a communication section 690. The storage section 620 stores item data 622, supply history data 624, dummy data 628, game data 629, and the like.

Note that the item data 622, the supply history data 624, and the dummy data 628 are similar to the item data 122, the supply history data 124, and the dummy data 128, respectively, and the update section 630 has a function similar to that of the update section 130.

Figure 11:
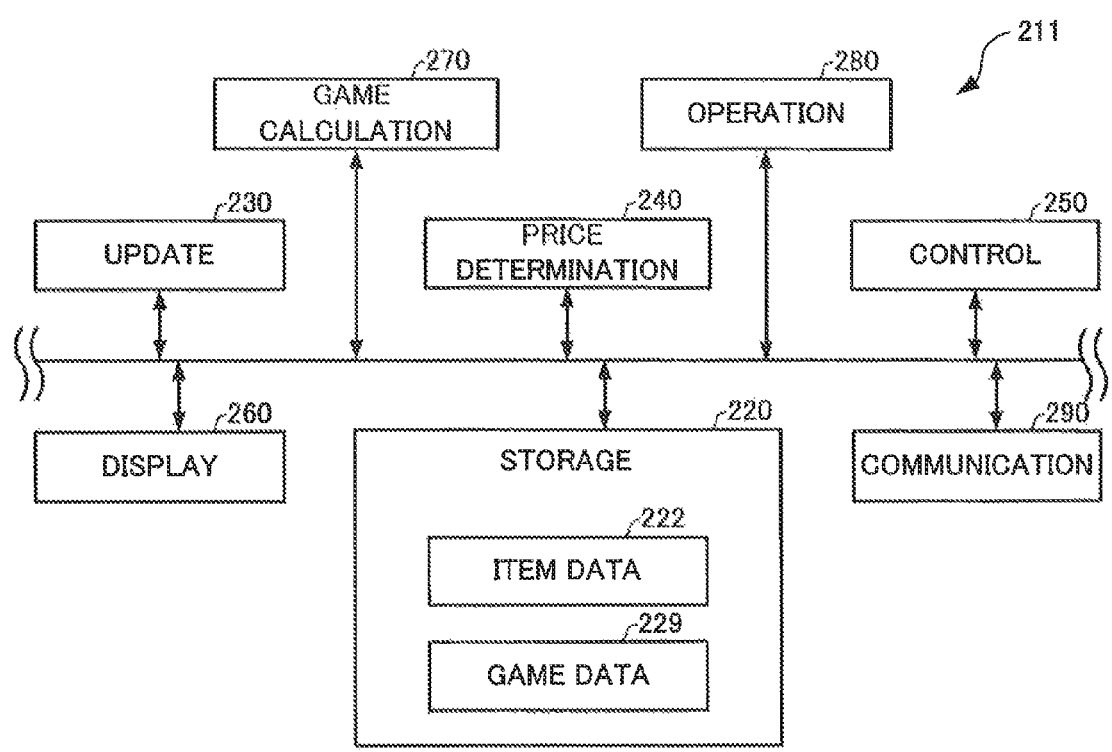
FIG. 11 is a diagram illustrating the functional blocks of a portable game device according to the second embodiment.

FIG. 11 is a diagram illustrating the functional blocks of the portable game device 211 according to the second embodiment. The portable game device 211 includes a storage section 220 that stores item data 222, game data 229, and the like, an update section 230, a price determination section 240, a control section 250, a display section 260 that displays a game image, an operation section 280 that allows the player to input operation information, a game calculation section 270 that performs a game calculation process based on the operation information, the game data 229, and the like, and a communication section 290.

The flow of a process using each section is described below. The communication section 690 included in the first game server 601 receives the operation information from the smartphone 201, the game calculation section 670 performs a game calculation process based on the operation information and the game data 629, the information generation section 660 generates game information based on the results of the game calculation process, and the communication section 690 transmits the game information to the smartphone 201.

The smartphone 201 displays the item find image 400 and the like based on the game information.

The control section 660 determines whether or not an item quantity change event of an event that may be supplied to the portable game device 211 has occurred during a first game that is executed by the smartphone 201 based on the operation information and the game data 629. When the control section 660 has determined that the item quantity change event has occurred, the update section 630 adds the item to the item data 622, and updates the supply history data 624. When the quantity of a specific item is insufficient, the update section 630 adds the item based on the dummy data 628 to the item data 622.

The communication section 191 included in the information provision apparatus 101 receives information about the item data 122 from the first game server 601, and receives information that indicates the download request from the portable game device 211. The information generation section 111 generates information that indicates the item based on the information about the item data 122, the provision history data 123, and the information that indicates the download request, and the communication section 191 transmits the item information to the portable game device 211 that has transmitted the download request. The update section 131 adds data that indicates the transmission date, the transmission target item, the transmission destination, and the like to the provision history data 123 when the communication section 191 has transmitted the item information.

The information generation section 111 generates information that indicates the supply quantity of each item for a specific time interval based on the information about the supply history data 624 received by the communication section 191, and the communication section 191 transmits the information generated by the information generation section 111 to the portable game device 211.

The communication section 291 included in the portable game device 211 receives the information transmitted from the communication section 191, the price determination section 240 determines the price of each item based on the information received by the communication section 291, and the update section 230 reflects the price of each item determined by the price determination section 240 in the item data 222. The communication section 291 receives the item information, and the update section 230 reflects the item information in the item data 222. The display section 260 can thus display the item list image 500 or the like that reflects the latest price and details of each item based on the item data 222.

The information provision apparatus 101 according to the second embodiment thus achieves the same effects as those achieved by the first embodiment.

Additional Embodiments

The invention is not limited to the above embodiments. Various modifications and variations may be made. For example, the item quantity change event is not limited to an event that increases the quantity of item, but may be an event that decreases the quantity of item. The information provision apparatus 100 and the like may detect occurrence of the item quantity change event by reading data that indicates occurrence of the item quantity change event and is stored in a memory card or the like instead of receiving information from the first terminal, for example. Likewise, the item information may be provided to the second terminal by storing the item information in a memory card or the like, and allowing the second terminal to read the item information from the memory card or the like, instead of transmitting information to the second terminal, for example. The item data may be updated by transmitting information that indicates the details of update, or transmitting update control information instead of transmitting information that indicates the supply history (see the second embodiment), for example.

The price determination section 140 and the like may adjust the price of each item corresponding to the quantity of each item that is possessed by the second terminal in the second game. For example, when the information that indicates the download request includes the quantity of each item that is possessed by the portable game device 210 that has transmitted the request in the second game, the price determination section 140 and the like may adjust the price of each item corresponding to the quantity of each item (e.g., so that the price of the item of which the quantity is larger than a reference value decreases, and the price of the item of which the quantity is smaller than the reference value increases). When data that indicates the number of items possessed by each portable game device 210 is stored in the storage section 120, the price determination section 140 and the like may adjust the price of each item based on the data stored in the storage section 120 when the information that indicates the download request has been received.

In the above embodiments, since the item is supplied when the item has been found in the game executed in the mobile phone 200, and the price of each item is determined based only on the supply quantity of each item, the price may be linked to the item find rate, so that a change in price may be small, which is undesirable. The information provision apparatus 100 and the like can more easily change the price of each item by adjusting the price of each item as described above.

The price determination section 140 and the like may adjust the price of each item corresponding to the current day of the week, the current time zone (e.g., morning, daytime, night, afternoon), or the like. This also makes it possible for the information provision apparatus 100 and the like to more easily change the price of each item.

The second game server 610 may have the function of the price determination section 140, and the information provision apparatus 100 may provide price determination information (e.g., the supply quantity or a coefficient or a reference value for calculating the price) to the second game server 610.

The first terminal may inquire of the player whether or not to supply the item to the virtual market, or allow the player to determine the price of the item supplied to the virtual market when the item quantity change event has occurred. The first terminal may add points to the score of the player when the item has been purchased in the virtual market instead of adding points to the score of the player when the item has been supplied to the virtual market. When the player arbitrarily supplies the item to the virtual market, the quantity of the item may become insufficient when the player holds off supplying (selling) the item, for example. The information provision apparatus 100 and the like can appropriately deal with such a situation by utilizing the dummy data, 128.

The name of the seller of each item displayed within the item list image 500 need not necessarily automatically generated. For example, the name of the seller of each item may be the player name, the real name, or the like. The update section 130 and the like may delete a specific item from the item data 122 when the quantity of the specific item is large, or may delete a specific item from the item data 122 when the elapsed time from provision of the specific item has exceeded a reference value. According to the above configuration, the information provision apparatus 100 and the like can prevent a situation in which the quantity of each item becomes too large, even if the number of players who can supply an item is large. Moreover, the update section 130 and the like need not delete the item from the item data 122 when providing the item information to the portable game device 210.

The update section 130 and the like may update the item data 122 so that only the item that has been purchased by the player of the portable game device 210 is deleted. The item is not limited to an ingredient, but may be a weapon, a protector, a tool, a recipe, or the like. The item is not limited to an item that can be sold. It suffices that the item be an item that can be exchanged or an item that can be provided. The determination target of the price determination section 140 and the like is not limited to the price of the item, but may be the value (e.g., exchange rate) of the item when exchanging the item.

The update section 130 and the like may set the parameter value (e.g., an increase in hit points due to consumption of an ingredient, an attack enable count, or a damage value applied to an enemy due to an attack) of an item that is added to the item data 122 when the item quantity change event has occurred, to a value that differs from the parameter value of an item that is added to the item data 122 independently of the item quantity change event. According to the above configuration, when the second game is executed by the second terminal, the game proceeds in a state that differs from a normal state since the parameter value of the item supplied by the first game differs from a normal parameter value. This makes it possible to prompt the player to supply an item in the first game, or purchase an item in the second game, for example.

A time limit (e.g., a time limit that allows the player to purchase an item only once a day), a quantitative limit (e.g., a quantitative limit that sets a maximum value to the quantity of item that can be provided to the second terminal, or limits the quantity of item that can be provided to the second terminal to 40 per day), or the like may be set when providing an item to the second terminal.

The first terminal or the second terminal may include a plurality of devices. For example, the smartphone 201 and a PC may be connected to the first game server 601 as the first terminal, and the portable game device 210 and a consumer game device may be connected to the second game server 611 as the second terminal. When the first terminal is a high-performance device (e.g., consumer game device), the first terminal may perform the game calculation process and the like instead of the first game server 600 or 601. Likewise, the game calculation process and the like may be performed by the second game server 610 or 611, and the game image information and the like may be distributed to the second terminal, or the second terminal may perform the game calculation process and the like.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. An information provision apparatus for a game system connected to mobile communication terminals and portable game devices, comprising:
   a memory;
   a communication section; and
   at least one server cooperatively operable with the memory and communication section, and configured to, based on instructions stored in the memory;
   store, in a storage section, item data that indicates a plurality of items that can be provided;
   update, in an update section, the item data when an item quantity change event has occurred during a first game that is executed by a first terminal that belongs to a first game network, the first terminal being a mobile communication terminal;
   cause, in a control section, the communication section to transmit item information to a second terminal that belongs to a second game network when a provision request operation has been performed by using the second terminal, the second terminal being a portable game device, the item information indicating at least one item that can be used in a second game that is executed by the second terminal, and being based on the item data, the plurality of items can be exchanged during the second game; and
   determine, in a determination section, a value of each of the plurality of items based on a change in quantity of each of the plurality of items,
   wherein the determination section adjusts a price of each of the plurality of items corresponding to the quantity of each of the plurality of items that is possessed b the second terminal in the second game.

2. The information provision apparatus as defined in claim 1, wherein
   the storage section stores provision history data about occurrence of an item provision event during the second game;
   the control section causes the communication section to transmit the item information based on the information about the item data to the second terminal based on the provision history data, and
   the update section updates the provision history data based on information that indicates an item provision request that has been received from the second terminal by the communication section.

3. The information provision apparatus as defined in claim 2,
   wherein the plurality of items can be sold during the second game; and
   wherein the determination section determines a price of each of the plurality of items so that the price decreases as the quantity of each of the plurality of items increases, regardless of a sales quantity of each of the plurality of items.

4. The information provision apparatus as defined in claim 2,
   wherein the determination section calculates the change in quantity of each of the plurality of items for a specific time interval in response to occurrence of the item quantity change event, and further determines the price of each of the plurality of items at the specific time interval.

5. The information provision apparatus as defined in claim 2,
   wherein the storage section stores dummy data about each of the plurality of items; and
   wherein the update section updates the item data to fill up a shortage of an item among the plurality of items based on the dummy data when a quantity of the item is insufficient.

6. The information provision apparatus as defined in claim 2,
   wherein the update section deletes an item among the plurality of items that is indicated by the item information transmitted by the communication section from the item data.

7. The information provision apparatus as defined in claim 1,
wherein the plurality of items can be sold during the second game; and
wherein the determination section further determines the price of each of the plurality of items so that the price decreases as the quantity of each of the plurality of items increases, regardless of a sales quantity of each of the plurality of items.

8. The information provision apparatus as defined in claim 1,
wherein the determination section calculates the change in quantity of each of the plurality of items for a specific time interval in response to occurrence of the item quantity change event, and further determines the price of each of the plurality of items at the specific time interval.

9. The information provision apparatus as defined in claim 1,
wherein the update section deletes an item among the plurality of items that is indicated by the item information transmitted by the communication section from the item data.

10. The information provision apparatus as defined in claim 1,
wherein the update section sets a parameter value of an among the plurality of items that is added to the item data when the item quantity change event has occurred, to a value that differs from a parameter value of an item among the plurality of items that is added to the item data independently of the item quantity change event.

11. A non-transitory computer-readable information storage medium storing a program that causes a computer having a storage section that stores item data indicating a plurality of items that can be provided, and a communication section, to function as:
an update section that updates the item data when an item quantity change event has occurred during a first game that is executed by a first terminal that belongs to a first game network;
a control section that causes the communication section to transmit item information to a second terminal that belongs to a second game network when a provision request operation has been performed by using the second terminal, the item information indicating at least one item that can be used in a second game that is executed by the second terminal, and being based on the item data, the plurality of items can be exchanged during the second game; and
a determination section that determines a value of each of the plurality of items based on a change in quantity of each of the plurality of items,
wherein the determination section adjusts a price of each of the plurality of items corresponding to the quantity of each of the plurality of items that is possessed by the second terminal in the second game.

12. An information provision apparatus for a game system connected to mobile communication terminals and portable game devices, comprising:
a memory;
a communication section and
at least one server cooperatively operable with the memory and communication section, and configured to, based on instructions stored in the memory;
store, in a storage section, item data that indicates a plurality of items that can be provided;
update, in an update section, the item data when an item quantity change event has occurred during a first game that is executed by a first terminal, the first terminal being a mobile communication terminal; and
cause, in a control section, the communication section to transmit item information to a second terminal when a provision request operation has been performed by using the second terminal, the second terminal being portable game device, the item information indicating at least one item that can be used in a second game that is executed by the second terminal, and being based on the item data,
wherein the storage section stores dummy data about each of the plurality of items, and
wherein the update section updates the item data to fill up a shortage of an item among the plurality of items based on the dummy data when a quantity of the item is insufficient.

13. An information provision apparatus for a game system connected to mobile communication terminals and portable game devices, comprising:
a memory;
a communication section; and
at least one server cooperatively operable with the memory and communication section, and configured to, based on instructions stored in the memory:
store, in a storage section, item data that indicates a plurality of items that can be provided;
update, in an update section, the item data when an item quantity change event has occurred during a first game that is executed by a first terminal, the first terminal being a mobile communication terminal; and
cause, in a control section, the communication section to transmit item information to a second terminal when a provision request operation has been performed by using the second terminal, the second terminal being a portable game device, the item information indicating at least one item that can be used in a second game that is executed by the second terminal, and being based on the item data,
wherein the storage section stores dummy data about each of the plurality of items, and
wherein the update section deletes the stored dummy data when the supply quantity of the item has become sufficient.

* * * * *